United States Patent [19]

Iyengar

[11] 4,456,485
[45] Jun. 26, 1984

[54] PROCESS FOR THE PREPARATION OF EASILY DISPERSIBLE, HIGH COLOR STRENGTH, POWDERED ALKALI BLUE PIGMENTS

[75] Inventor: Doreswamy R. Iyengar, Holland, Mich. Joachim Jesse; Weisenheim, Fed. Rep. of Germany

[73] Assignee: BASF Wyandotte Corporation, Wyandotte, Mich.

[21] Appl. No.: 466,759

[22] Filed: Feb. 15, 1983

Related U.S. Application Data

[63] Continuation-in-part of Ser. No. 271,438, Jun. 8, 1981, Pat. No. 4,373,962, and Ser. No. 271,594, Jun. 8, 1981, Pat. No. 4,383,865.

[51] Int. Cl.$^3$ .............................................. C09B 48/00
[52] U.S. Cl. .................................. 106/288 Q; 106/22; 106/308 Q; 106/308 N; 106/308 S
[58] Field of Search ............... 106/22, 288 Q, 308 Q, 106/308 N, 308 S

[56] References Cited

U.S. PATENT DOCUMENTS 3,635,745  1/1972  Rentel et al. ................. 106/288 Q
3,925,094 12/1975  Papenfuss et al. ............ 106/288 Q
4,032,357  6/1977  Rees et al. .................... 106/288 Q
4,189,328  2/1980  Flores .......................... 106/288 Q Primary Examiner—James Poer
Attorney, Agent, or Firm—Bernhard R. Swick

[57] ABSTRACT

Easily dispersible alkali blue pigments with high color strength are obtained if the pigment is precipitated in the presence of (1) primary, secondary or tertiary aliphatic amines, (2) N-alkylamino alkanic acid, (3) a diaryl or triarylamine, (4) an acid or neutral aliphatic ester of phosphoric acid, (5) a half ester of sulfuric acid based on fatty alcohol, fatty alcohol-EO adducts or alkyl phenol-EO adducts, (6) an alkane or alkene sulfonic acid on a dialkylsulfimide, (7) EO adducts based on alkylphenols, alkanols or alkylamines, (8) polypropylene glycol or PO/EO block copolymers based on alkane diols or alkane polyols or in the presence of mixtures of these compounds or is mixed with at least one of the substances listed under (1) to (8) after the precipitation with acid in the acid suspension and is isolated.

Alkali blue pigments are obtained which are easily dispersible in offset printing ink varnishes and which result in excellent color strength of the printed matter.

37 Claims, No Drawings

PROCESS FOR THE PREPARATION OF EASILY DISPERSIBLE, HIGH COLOR STRENGTH, POWDERED ALKALI BLUE PIGMENTS

CROSS REFERENCE TO RELATED APPLICATION

This application is a continuation-in-part of U.S. Patent Application Ser. No. 271,438 filed June 8, 1981, now U.S. Pat. No. 4,373,962, and U.S. Patent Application Ser. No. 271,594, now U.S. Pat. No. 4,383,865.

BACKGROUND OF THE INVENTION

1. Field of the Invention

The invention relates to a method for the preparation of easily dispersible, high color strength alkali blue pigments and the pigments produced according to this method.

2. Description of the Prior Art

"Alkali blue" has been known for a considerable length of time. In form of the internal salt it is used to a great extent as pigment for printing inks.

"Alkali blue" corresponds with the following general formula:

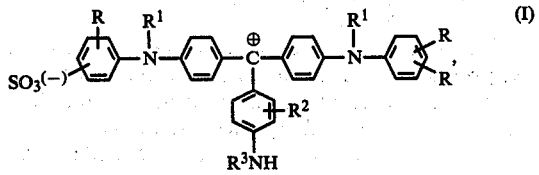

(I)

In this formula, R is hydrogen, chlorine, bromine, $C_1$- to $C_4$-alkyl, $C_1$ to $C_4$-alkoxy, nitro, amino, $C_1$- to $C_4$-alkylamino, $R^1$ is hydrogen or $C_1$- to $C_4$-alkyl, $R^2$ hydrogen, $C_1$- to $C_4$- alkyl, chlorine, bromine or $SO_3H_7$ and $R^3$ is hydrogen or phenyl which is possibly substituted by R. $R^2$ is preferably a hydrogen or $C_1$- to $C_4$-alkyl.

Since the pigments of formula I are strongly polar and hydrophilic, drying of the presscakes results in hard, no longer dispersible agglomerates and aggregates. To be added to this is the fact that strong hydrogen bonds exist at the surface due to the extremely fine pigment particles. This makes it difficult to prepare a dyestuff suitable for printing by milling the dry pigment in bonding agents and/or bonding agent solutions suitable for this purpose on the triple roller grinding mill. (E. K. Fischer in *American Inkmaker*, volume 23 (1945), No. 12; G. R. Buckwalter in T. C. Patton, Pigment Handbook, vol. 1, page 620, John Wiley & Sons, New York 1973.)

For this reason, other methods were developed for processing "alkali blue pigments" such as the flush method. In these processes, the moist pigment, for instance, in a form of a presscake is transferred into the desired mixture of bonding agent/solvent by mixing or kneading while being wetted by the organic phase. The resultant "flush paste" can be used directly for the preparation of printing inks. As a rule, the paste prepared according to the flush method contains 35 to 40 percent by weight of pigment. A drawback of the flush method is that large and thus expensive kneaders are required for the large-scale production of pigment paste and that the paste is produced on a discontinuous basis. This results in high manufacturing costs. Another drawback of flush paste is the high (60 to 65 percent by weight) amount of bonding agent and solvent since these must be compatible with other (additional) binders and/or solvents used in the preparation of printing inks. Additional difficulties are incurred in adjusting the color strength, the viscosity, and tackiness in the completed printing inks which are required for use.

For this reason, an attempt was made to produce alkali blue preparations with higher concentrations which can be used on a broader basis. Thus, preparations are known which contain 10 to 70 percent by weight of one or more natural and/or synthetic resins which result in easily dispersible pigment powders after drying which supply printing inks with high color strength and excellent crystal hardness.

U.S. Pat. No. 4,032,357 describes the preparation of powdered alkali blue preparations by combined precipitation of the pigment and an anionic organic dispersing agent which contains at least 8 carbon atoms and which is not soluble in water in its acid form and the subsequent addition of a hydrophobic oil to the precipitate or the presscake of the precipitate.

Preparations are known from U.S. Pat. No. 3,925,094 which are obtained by precipitating a solution of alkali blue and a resin which can be precipitated with acid in an aromatic amine which is liquid to temperatures to below 50° C. by discharging in aqueous acid. The preparations are easily dispersible and display high color strength.

U.S. Pat. No. 3,635,745 describes the preparation of powdered alkali blue preparations by the combined precipitation with acid of an alkaline solution containing alkali blue and an acid resin.

It is known from U.S. Pat. No. 4,189,328 to produce preparations of alkali blue by precipitating with acid (pH <5) an alkaline solution of alkali blue and a phenol which is insoluble in water at pH <5 and has a melting point of 35° C.

It is the purpose of this invention to prepare a powdered alkali blue which is easily dispersible in the binders or binder solutions commonly used for the preparation of offset printing inks and which has a good crystal hardness.

DESCRIPTION OF THE PREFERRED EMBODIMENT

It was found that powdered, easily dispersible, high color strength alkali blue pigments are obtained by precipitation from an aqueous solution of alkali blue with mineral acid if the pigment is either precipitated in the presence of (1) primary, secondary or tertiary aliphatic amines carrying at least one $C_{10}$- to $C_{20}$ alkyl and/or $C_8$- to $C_{20}$ alkoxy $C_2$- to $C_4$- alkyl, (2) N-$C_8$ to $C_{20}$ alkylamino $C_2$- to $C_8$ alkanic acids, (3) diaryl- or triarylamines, (4) acid or neutral esters or phosphoric acid based on fatty alcohol, fatty alcohol alkoxylates, polypropylene glycol, polyethylene glycol or block copolymers based on propylene oxide and ethylene oxide, (5) half esters of sulfuric acid based on $C_{10}$ to $C_{20}$ fatty alcohols, fatty alcohol ethylene oxide adducts or $C_5$- to $C_{20}$ alkyl phenol ethylene oxide adducts, (6) $C_8$- to $C_{20}$-alkane on alkene sulfonic acids, $C_6$- to $C_{20}$-alkylbenzene sulfonic acids, $C_1$- to $C_{20}$- alkyl naphthalene sulfonic acids or of di-$C_6$- to $C_{20}$ alkylsulfimides, (7) ethylene oxide adducts based on $C_1$- to $C_{20}$- alkyl phenols, $C_8$- to $C_{20}$- alkanols or $C_{10}$- to $C_{20}$-alkyl amines wherein the adducts contain at least 5 ethylene oxide radicals, (8) propylene glycols or of block copolymers based on alkane diols or polyols with 2 to 8 carbon atoms with propylene oxide and ethylene oxide or mixtures of these substances at temperatures of 50° to 100° C. or the pigment alone is precipitated at 50+ to 100° C. after which at least one of the substances mentioned under (1) to (8) is added to the warm pigment suspension while mixing. At the end of the precipitation and/or prior to isolation, the pH value of the suspension is 0.8 to 5 following the precipitation, the pigment is separated, washed and dried.

In accordance with this method, an alkali blue with high color strength is obtained which is easily dispersible in the binders and/or binder solutions used for the preparation of offset printing inks and which has an excellent crystal hardness.

It was surprising to find that easily dispersible alkali blue pigments can be obtained without a resin and/or a hydrophobic oil phase strictly by precipitation in the presence of anionic or nonionic auxiliaries or with mixtures of these substances. It was also surprising to find that part of the substances in the presence of which the pigment is precipitated were not known to have a dispersing effect. On the other hand, compounds which are known to be very effective dispersing agents do not show any effect.

The process can be implemented according to two variations: (A) the alkali blue produced by the synthesis is dissolved in aqueous alkali hydroxide at temperatures of 60° C. to 100° C., preferably 85° C. to 100° C., at least one substance mentioned under (1) to (8) is added to this solution and the acid is then allowed to flow into the alkaline solution or the alkaline solution into the acid. The amount of acid must be such that the suspension has a pH value of 0.8 to 5 at the end of the precipitation. Preferably enough acid is used so that the pH value is 0.8 to 3 at the end of the precipitation process.

However, one may also proceed in such a manner (variation (B)) that the pigment is initially precipitated from the alkaline solution and the warm suspension is then mixed with one of the substances mentioned under (1) to (8) or a mixture thereof.

In either case, the pigment is isolated in the generally employed manner.

The method (A) may be varied further. For example, substance (1) through (8) may be placed in the acid or may be added together with the acid. Another variation consists of the fact that the substance may be contained in the alkaline solution as well as in the acid.

As a rule, the aqueous alkaline solution of alkali blue has a pH value of 12 to 13. Advantageously, the concentration is 4 to 10 percent by weight based on calculated dry alkali blue.

When employing variation (A), at least one of the substances (1) to (8) is then added to the alkaline solution. Generally the temperature is 60° C. to 100° C.

The precipitation takes place at temperatures from 50° C. to 100° C., preferably at 60° C. to 90° C. Following this procedure, the suspension is heated to 60° C. to 95° C., preferably to 85° C. to 95° C., and is maintained at this temperature possibly up to one hour whereupon it is filtered while being hot. The filtered substance is then washed and dried.

The material is advantageously dried under reduced pressure at a temperature of 45° C. to 80° C. The dried product can also be ground.

To be taken into consideration as the raw material is the crude alkaline blue in form of the aqueous presscake which can be produced according to known methods.

Alkali blue can be prepared by reacting parafuchsin with aniline followed by sulfonating with sulfuric acid. The crude alkali blue is precipitated by discharging in water.

According to a different method, alkali blue is prepared by reacting an aluminum or iron trihalide complex compound of a 4,4′,4″-trihalogen triphenylmethylhalide with anilines with subsequent sulfonization (German Patent No. 1,644,619, German Published Application No. 2,545,649 and German Published Application No. 2,753,072).

Alkali blue produced according to the method of European patent application No. 60,428 can be used with equal success. According to this method, an aluminum or iron trihalide complex compound of a 4,4′,4″-trihalogen triphenylmethylhalide is initially reacted with an amino benzene sulfonic acid or naphthylamino sulfonic acid and is then reacted with one or more anilines resulting in an exchange of the halogen atoms in the number 4 position.

The following substances are taken into consideration as products in whose presence the precipitation of the alkali blue pigment takes place or which are added after the precipitation of the pigment suspension:

(1) primary, secondary, or tertiary aliphatic amines carrying at least one $C_{10}$- to $C_{20}$-alkyl and/or at least one $C_8$- to $C_{20}$-alkoxy $C_2$- to $C_4$-alkyl;

(2) N-$C_8$- to $C_{20}$-alkylamino-$C_2$- to $C_8$-alkanic acids;

(3) diaryl- and triarylamines;

(4) acid or neutral esters of phosphoric acid based on $C_3$- to $C_{18}$-alkanols of fatty alcohol-EO adducts, fatty alcohol-PO/EO adducts, polypropylene glycol, polyethylene glycol and block copolymers with ethylene oxide (EO) and propylene oxide (PO);

(5) half ester of sulfuric acid based on $C_{10}$- to $C_{20}$-fatty alcohols and $C_5$- to $C_{20}$-alkyl phenol-EO adducts;

(6) $C_8$- to $C_{20}$-alkane and alkene sulfonic acids, $C_6$- to $C_{20}$-alkyl benzene sulfonic acids, $C_1$- to $C_{20}$-alkyl naphthalene sulfonic acids and di-$C_6$- to $C_{20}$-alkyl sulfimide;

(7) ethylene oxide adducts of $C_1$- to $C_{20}$-alkyl phenols, $C_8$- to $C_{20}$-alkanols (fatty alcohols), and $C_{10}$- to $C_{20}$-alkyl amines with the adducts containing an average of at least 5 moles of EO per mole;

(8) polypropylene glycol or block copolymers based on alkane diols and alkane polyols with 3 to 5 hydroxyl groups and 2 to 8 carbon atoms with PO or EO or their EO adducts; mixtures of these substances may also be used.

Examples and detail include the following:

(1) (a) primary amines: decylamine, dodecylamine, tridecylamine, tetradecylamine, hexadecylamine, octadecylamine, 2-octoxyethylamine, 3-octoxypropylamine, 3(2′-ethylhexoxy)propylamine, 3-decoxypropylamine, 3-dodecoxypropylmaine, 3-tetradecoxypropylamine, 3-octadecoxypropylamine, 3-hexadecoxypropylamine and the corresponding 2-alkoxyethylamines, tallow fatty amine, coconut fatty amine and soy amine;

(b) secondary and tertiary amines: preferably mono-N-and di-N,N-$C_1$- to $C_4$-alkyl-N-$C_{10}$- to $C_{20}$-alkylamines or -N-($C_8$- to $C_{20}$-alkoxy-$C_2$ - to $C_4$-alkyl)amines: N-methyloctadecylamine, N,N-dimethyloctadecylamine, N,N-diethyloctadecylamine, N,N-di-propyloctadecylamine, N,N-dimethylhexadecylamine, N,N-dimethyltetradecylamine, N,N-dimethyl-dodecylamine, N,N-dimethyl-3-octadecoxypropylamine; N,N-diethyl-3-octadecoxypropylamine, N,N-dibutyl-3-octadecoxypropylamine, N,N-dimethyl-3-hexadecoxypropylamine, N,N-dimethyl-3-tetradecoxypropylamine, N,N-dimethyl-3-dodecoxypropylamine, N,N-dimethyl-3-decoxypropylamine, N,N-dimethyl-3-octoxypropylamine, N,N-diemthyl-3(2'-ethylhexoxy)-propylamine or technical mixtures such as dicoconut fatty amine.

(2) alkylaminoalkanic acids: preferably N-$C_8$- to $C_{18}$-alkylaminobuteric acids such as N-$C_{18}$-alkylaminobuteric acid, N-$C_{16}$-alkylaminobuteric acid, N-coconut fatty-$\beta$-aminobuteric acid, N-$C_{14}$-alkylaminobuteric acid, N-$C_{12}$-alkyl aminobuteric acid, N-$C_{10}$-alkyl aminobuteric acid, C-$C_8$-alkyl aminobuteric acid.

(3) diaryl- and triarylamines: diphenylamine, N-methyl-diphenylamine, N-ethyldiphenylamine, N-4-methylphenyl aniline, N-4-methoxyphenyl aniline, triphenylamine, N-phenyl-naphthylamine.

(4)
(a) neutral esters of phosphoric acid: tri-$C_3$- to $C_{18}$-alkyl phosphates such as tri-n-propylphosphate, tributylphosphate, trihexylphosphate, trioctylphosphate, trinonylphosphate, tridecylphosphate, tridodecylphosphate, tritetradecylphosphate, trihexadecylphosphate and trioctyldecylphosphate with the esters preferably being used together with nonionic auxiliaries (7).

(b) acid esters of phosphoric acid based on oxoalcohol-fatty alcohol alkoxylates such as fatty alcohol-EO- and PO/EO adducts polypropylene glycol, polyethylene glycol, and PO/EO block copolymers: mono and diesters of phosphoric acid with reaction products of $C_8$ to $C_{20}$ alkanols with EO/PO or PO +EO such as $C_8$ to $C_{12}$ oxoalcohols (mixture) with 2 to 50, preferably 2 to 20 moles of EO per mole of alcohol, dodecanol +3 to 5 EO, n- and i-decanol +3 to 5 EO, $C_{12}$ to $C_{16}$ alkanol mixtures +3 to 20 EO, $C_{16}$ alkanol with 3 to 20 EO; stearylalcohol +3 to 20 EO, myristylalcohol +3 to 20 EO, coconutfattyalcohol +3 to 20 EO; $C_8$ to $C_{12}$ oxoalcohol +3 to 20 PO; $C_{11}$ to $C_{16}$ alkanol mixture +3 to 20 PO; $C_8$ to $C_{12}$-oxoalcohol mixture +3 to 10 PO then +5 to 25 EO; $C_{13}$ to $C_{15}$ oxoalcohol mixture +3 to 10 PO then 5 to 25 EO; n- and i-decanol +3 to 10 PO +5 to 25 EO; dedecanol +3 to 10 PO +5 to 25 EO; $C_{16}$ fatty alcohol +3 to 10 PO +5 to 25 EO; myristylalcohol +3 to 10 PO +5 to 25 EO; coconutfattyalcohol +3 to 10 PO +5 to 25 EO, stearylalcohol +3 to 10 PO +5 to 25 EO.

The acid phosphates contain 1 or 2 of these radicals and as a rule are mixtures of mono and diesters.

(5) Semiesters of sulfuric acid of fatty alcohols with 10 to 20 carbon atoms, their EO adducts and $C_5$ to $C_{20}$ alkylphenol-EO adducts: stearylalcohol sulfate, palmitinalcohol sulfate, $C_{11}$ to $C_{13}$ alkanol sulfate, coconutfattyalcohol sulfate, dodecylalcohol sulfate, $C_{13}$ to $C_{15}$ fatty alcohol sulfate, halfester of sulfuric acid of $C_{12}$ to $C_{14}$ fattyalcohol +2 to 10 (particularly 2 to 6) EO, stearylalcohol with 2 to 6 EO, palmitinalcohol +2 to 6 EO, coconut fatty alcohol +2 to 6 EO, dodecanol +2 to 10 EO, $C_{11}$ to $C_{13}$ oxoalcohol +2 to 6 EO, half ester of sulfuric acid adducts of 2 to 10 EO to hexylphenol, n- and i-octylphenol, i-nonylphenol, decylphenol, dodecylphenol, tetradecylphenol, hexadecylphenol, octadecylphenol, to mixtures of $C_8/C_{11}$ alkylphenols.

(6) Alkane and alkenesulfonic acids, alkylbenzene and alkylnaphthalenesulfonic acids: n- and i-octanesulfonic acid, nonanesulfonic acid, decanesulfonic acid, dodecanesulfonic acid, tridecanesulfonic acid, tetradecanesulfonic acid, hexadecanesulfonic acid, octadecanesulfonic acid; hexylbenzenesulfonic acid, octylbenzenesulfonic acid, nonylbenzenesulfonic acid, decylbenzenesulfonic acid, dodecylbenzenesulfonic acid, tridecylbenzenesulfonic acid, tetradecylbenzenesulfonic acid, hexadecylbenzenesulfonic acid, octadecylbenzenesulfonic acid, 1- and 2-naphthalenesulfonic acid, n- and i-butylnaphthalenesulfonic acid, i-propylnaphthalenesulfonic acid, i-hexylnaphthalenesulfonic acid, i-octylnaphthalenesulfonic acid.

(7) EO adducts to alkyl phenols, fatty alcohols and alkylamines:
(a) examples for phenols include: hexylphenol, i-octylphenol, nonylphenol, decylphenol, dodecylphenol, tridecylphenol, tetradecylphenol, hexadecylphenol and octadecylphenol with 5 to 60 moles of EO, preferably 5 to 30 moles of EO per mole of phenol;
(b) examples for fatty alcohols include: octanol, nonanol, decanol, dodecanol, tetradecanol, tridecanol, hexadecanol, octadecanol, $C_8$-$C_{11}$-oxoalcohol mixtures, $C_{11}$-$C_{15}$-oxoalcohol mixtures, $C_{13}$-$C_{15}$-oxoalcohol mixtures, coconut fatty alcohol, stearyl alcohol, palmitin alcohol with 5 to 60 moles EO, preferably 5 to 25 moles per mole of alcohol.

(8) Polypropylene glycol and EO/PO block copolymers of alkane diols and alkane polyols:
(a) polypropylene glycol with an average molecular weight of 500 to 5000.
(b) EO/PO block copolymers which are produced by reacting alkane diols/alkane polyols with PO and then with EO. Examples for alkane diols-polyols include: glycol, propylene glycol, 1,4-, 1,2- or 2,3-butane diol, 1,6-hexane diol, octane diol, glycerine, butane triol, trimethylol propane and sorbitol. The EO content may vary between 20 and 70 percent by weight based on the polymer, and the molecular weight may vary between approximately 1,000 and 50,000.

Among the substances mentioned under (1) to (8), those of groups (1), (2), (4), (5), (6) and (7) are preferred.

Special mention should be made of the following substances which are listed in the above-mentioned group:

(1.1) $C_{10}$- to $C_{20}$-alkyl amines, N-$C_1$- to $C_4$- alkyl-N-$C_{10}$- to $C_{20}$-alkyl amines, di-N,N-$C_1$- to $C_4$- alkyl-N-$C_{10}$- to $C_{20}$-alkyl amines; $C_8$- to $C_{18}$-alkoxy propylmaines, di-N,N- $C_1$- to $C_4$-alkyl-N-$C_8$- to $C_{18}$-alkoxypropylamines, (2.1) N-$C_{10}$- to $C_{20}$-alkylaminobuteric acids, (4.1)
(a) neutral esters of phosphoric acid of $C_3$- to $C_{18}$-alkanols mixed with nonionic EO adducts of group (7), (4.1)

(b) acid esters of phosphoric acid based on EO or PO-EO adducts to $C_{10}$- to $C_{20}$-alkanols, (5.1) half esters of sulfuric acid of EO adducts to $C_{10}$- to $C_{20}$-alkonols or to $C_6$- to $C_{20}$-alkylphenols with 2 to 6 moles EO per mole, (6.1) $C_8$- to $C_{20}$-alkyl benzene sulfonic acids, (7.1) EO adducts of $C_6$- to $C_{20}$alkyl phenol and $C_8$- to $C_{20}$- alkanols with 7 to 55 moles of EO per mole of phenol and/or alkanol.

Further mention should be made of (9) mixtures of acid esters of phosphoric acid of group (4(b)), particularly (4.1(b))) with amines of group (1), particularly (1.1) and

(10) mixtures of alkyl benzene sulfonic acids of group (6), primarily (6.1) with amines of group (1), particularly of group (1.1).

Particularly preferred are (1.2) $C_{14}$- to $C_{20}$-alkyl amine, 3-($C_{10}$- to $C_{20}$-alkoxy)-propylamines where the N-atoms of the amines were possibly substituted by $C_1$- to $C_4$-alkyl, particularly by methyl or ethyl on a single or two-fold basis, particularly stearylamine and di- $C_1$- to $C_4$-alkyl stearylamines such as N,N-dimethyl- dimethyl- and N,N-diethylstearylamine as well as the substances mentioned under (2.1), (4.1), (5.1), (6.1), (7.1), (9) and (10).

The amounts of the substances (1) through (8) or mixtures of these substances such as (9) and (10) are 2 to 20 percent by weight. Preferably the amounts are 3 to 16, particularly 4 to 13 percent by weight based on alkali blue.

The substances can be added to the alkaline solution of alkali blue directly while the mixture is stirred vigorously. The addition in form of an aqueous solution or emulsion is advantageous. The latter type of addition is advantageous particularly for use with process variation B.

The process of this invention is further explained by the examples below. Percentages are relative to weight.

EXAMPLE 1

Seventy-five grams of a hydrous 24 percent presscake of alkali blue produced by phenylation of parafuchsin with aniline followed by subsequent sulfonization with sulfuric acid were suspended in 450 liters of water. After adding 4.5 grams of sodium hydroxide, the mixture was heated to 90° C. to 100° C. where upon the pigment went into solution.

The hot alkaline solution was allowed to run into a mixture of 225 ml of water, 15 ml 32 percent hydrochloric acid and 2 grams diphenylamine at a temperature of 60° C. The mixture was heated to 95° C. and was stirred at this temperature for 10 minutes. The suspension had a pH of 1. The precipitated product was removed by filtration, washed until salt free and dried at 55° C. in a vaccum dryer. After grinding, a high color strength pigment was obtained which was easily dispersible in the printing ink varnish.

EXAMPLE 2

Seventy-five grams of a hydrous 24 percent presscake of alkali blue produced by phenylation of parafuchsin with aniline followed by subsequent sulfonization with sulfuric acid were dissolved in sodium hydroxide solution as described in Example 1. The solution was allowed to cool to 65° C., and the pigment was precipitated from the alkaline solution up to a pH value of 2.5 by using 15 percent sulfuric acid. Subsequently, 2 grams of diphenylamine were added to the suspension, the mixture was heated to 95° C. and was stirred at this temperature for 10 minutes. The product was removed by filtration, washed until salt free and dried in a vaccum at 55° C. This also results in a pigment of high color strength and easily dispersible in the printing ink varnish.

EXAMPLE 3

Example 1 was repeated but 2 grams of N,N-dimethylstearylamine were used instead of the diphenylamine. After isolating, washing and drying, a high color strength pigment was obtained which was easily dispersible in the printing ink varnish.

EXAMPLE 4

The procedure was that described in Example 2 but diphenylamine was replaced by 2 grams of N,N-dimethylstearylamine. The result in this case also was a high color strength pigment easily dispersible in the printing ink varnish.

EXAMPLE 5

The work was carried out in accordance with the data in Example 1 but 2 grams of stearylamine were used instead of the diphenylamine. The result is a high color strength pigment easily dispersible in the printing varnish.

EXAMPLE 6

Eighteen grams alkali blue in the form of the moist 24 percent presscake (=75 grams) were dissolved in sodium hydroxide solution as described in Example 1. A mixture of 1.4 grams of triisobutylphosphate, 0.5 grams of the addition product of 20 moles of EO to 1 mole of isononylphenol and 0.2 grams of the addition product of 5 moles EO to 1 mole of iso-decanol were added to this solution. The hot alkaline mixture was allowed to run into 15 ml of 30 percent hydrochloric acid in 225 ml of water at 65° C. The mixture was heated to 95° C. and was agitated at this temperature for 10 minutes. The precipitated product was removed by filtration, washed until salt free and dried in a vacuum at 55° C. After milling, a high color strength pigment was obtained which was easily dispersible in the printing ink varnish.

EXAMPLE 7

Eighteen grams of alkali blue in the form of the moist 24 percent presscake (=75 grams moist) were dissolved in sodium hydroxide solution as described in Example 1. Added to the alkaline solution were 2 grams of an acid ester of phosphoric acid containing as ester group a reaction product of dodecanol with 3 moles of EO and which carried an average of 1.3 ester groups. The further procedure was analogous to that put forth in Example 6, resulting in a pigment of high color strength, easily dispersible in offset printing ink binders.

EXAMPLE 8

Fifty grams of alkali blue produced according to the method described in European Patent Application 60,428 were dissolved in a mixture of 6 grams sodium hydroxide and 600 ml of water at 95° C. and were added to the alkaline solution of a mixture of 3.5 grams of triisobutylphosphate, gram of reaction product of isononylphenol with 20 EO and 0.3 grams of the reaction product of iso-decanol with 5 EO. The hot alkaline solution was discharged into 20 ml of 32 percent hydrochloric acid in 200 ml of water at 60° C. The mixture was heated to 95° C. and was agitated at this temperature for 10 minutes. The precipitated product was removed by filtration, washed until salt free and dried in a vacuum at 55° C. After milling, a pigment of high color strength was obtained which was very easily dispersible in the printing ink varnish.

EXAMPLE 9

The procedure was analogous to that described in Example 8, however, a mixture of 0.7 grams of triisobutylphosphate, 0.2 grams nonylphenol/20 EO and 0.1 grams isodecanol/5 EO was added to the alkaline solution. The resultant pigment had a markedly higher color strength compared to the pigment obtained according to Example 8, however, the pigment also had a somewhat higher dispersion hardness.

EXAMPLE 10

An amount of 75 grams of a moist 24 percent presscake of alkali blue produced by phenylizing parafuchsin with aniline followed by sulfating with sulfuric acid were suspended in 450 ml of water. After adding 4.5 grams of sodium hydroxide, the mixture was heated to 90° C. to 100° C. whereupon the pigment went into solution. Subsequently a 1:1 mixture of a reaction product of a $C_9$- to $C_{11}$-oxoalcohol mixture with 10 moles of PO per mole of alcohol and a mono-$C_9$-$C_{11}$ alkyl phosphate was added to the solution.

The hot alkaline solution was run into a mixture of 225 ml of water, 15 ml of a 32 percent hydrochloric acid and one gram N,N-dimethylstearylamine at a temperature of 60° C. The mixture was heated to 95° C. and was agitated at this temperature for 10 minutes. The precipitated product was removed by filtration, washed until salt free and dried in a vacuum at 55° C. After milling, a high color strength pigment was obtained which was easily dispersible in the printing ink varnish.

EXAMPLE 11

Example 10 was repeated but one gram of an acid ester of phosphoric acid based on polypropylene oxide having a mole weight of 2000 was used in the alkaline solution. This process also resulted in a high color strength powder which was easily dispersible in the printing ink varnish.

EXAMPLE 12

An amount of 75 grams of a moist 24 percent presscake of alkali blue produced by phenylizing parafuchsin with aniline and subsequent sulfurization with sulfuric acid are suspended in 450 ml of water. After adding 4.5 grams of sodium hydroxide, the mixture was heated to 90° C. to 100° C. whereupon the pigment went into solution. Subsequently, 0.5 gram of an acid ester of phosphoric acid was added which contained as ester group a reaction product of a $C_{13}$-$C_{15}$ oxoalcohol mixture with 6 moles of PO and then with 12 moles of EO per mole of alcohol.

The hot alkaline solution was run into a mixture of 225 ml water, 15 ml 32 percent hydrochloric acid and 0.5 gram of N,N-dimethylstearylamine at 60° C. The mixture was heated to 95° C. and was agitated at this temperature for 10 minutes. The precipitated product was removed by filtration, was washed until salt free and was dried in a vacuum at 55° C. After milling, a high color strength pigment was obtained which was easily dispersible in the printing ink varnish.

EXAMPLE 13

Example 12 was repeated but the N,N-dimethylstearylamine was replaced by 0.5 grams of stearylamine in the acid solution. This also resulted in a high color strength pigment easily dispersible in the printing ink varnish.

EXAMPLE 14

Example 12 was repeated but the acid ester of phosphoric acid mentioned there was replaced by one gram of an acid ester of phosphoric acid carrying as the ester group a reaction product of dodecanol with 3 EO and carrying an average of 1.3 ester groups. This procedure also resulted in a high color strength pigment easily dispersible in the printing ink varnish.

EXAMPLE 15

Example 14 was repeated but the mixture was heated to only 85° C. after precipitation and was stirred at this temperature for 10 minutes. The procedure also resulted in a high color strength pigment which, however, was less easily dispersible in the offset printing ink varnish than the pigment prepared in accordance with Example 14.

EXAMPLE 16

Example 14 was repeated but the mixture was stirred at only 75° C. for 10 minutes. After isolating the alkali blue, a high color strength pigment was obtained which was even more difficult to disperse in the offset printing ink varnish than the pigment powder obtained in accordance with Example 15.

EXAMPLE 17

An amount of 75 grams of a moist 24 percent presscake of alkali blue produced by phenylation of parafuchsin with aniline and subsequent sulfurization with sulfuric acid was suspended in 450 ml water. After adding 4.5 grams of sodium hydroxide, the mixture was heated to 90° C. to 100° C. whereupon the pigment went into solution. The hot alkaline solution was allowed to run into a 60° C. mixture of 15 ml of a 32 percent hydrochloric acid in 225 ml of water, and this mixture was subsequently mixed with one gram of dodecylbenzene sulfonic acid and one gram of N,N-dimethylstearylamine. Subsequently the mixture was heated to 95° C. and was agitated at this temperature for 10 minutes. The precipitated product was removed by filtration, was washed until salt free and dried in a vacuum at 55° C. After milling, a high color strength of pigment was obtained which was easily dispersible in the printing ink varnish.

COMPARISON EXAMPLE 1

An amount of 75 grams of a moist 24 percent presscake of alkali blue prepared by phenylation of parafuchsin with aniline and subsequent sulfurization with sulfuric acid was suspended in 450 ml of water. After adding 4.5 grams of sodium hydroxide, the mixture was heated to 95° C. whereupon the pigment went into solution. The hot alkaline solution was allowed to run into 15 ml of a 32 percent hydrochloric acid in 225 ml of water at a temperature of 60° C. Subsequently, the mixture was heated to 95° C and was agitated at this temperature for 10 minutes.

The precipitated product was removed by filtration, washed until salt free and dried in a vacuum at 55° C.

After milling, a pigment of low color strength was obtained which was very difficult to disperse in the printing varnish.

COMPARISON EXAMPLE 2

The alkali blue was dissolved in sodium hydroxide solution, as described in Comparison Example 1, but the pigment was precipitated from the hot alkaline solution with sulfuric acid until a pH value of 2.5 was reached. This also resulted in a powder of low color strength which was very difficult to disperse in the printing ink varnish.

APPLICATION EXAMPLE: OFFSET PRINTING INK

The alkali blue pigments (7.5 grams each) prepared in accordance with Examples 1-17 and Comparison Examples 1 (pigment 18) and 2 (pigment 19) were dispersed in an offset printing ink varnish (42.2 grams each) in the dissolver at 50° C. Duration: 35 minutes. The resultant paste was then milled on a three roller mill.

| Printing Ink 1: 1 passage | with a roller pressure of |
| Printing Ink 2: 3 passages | 15 bar |

For comparison purposes, a recognized good alkali blue pigment which is commercially available under the name of Reflexblue R 50 was processed into an offset printing ink (pigment I).

After cutting the paste with white, the color strength was determined of the paste taken from the dissolver and of printing inks 1 and 2.

In addition to this, the dispersion hardness (DH) was determined from the color strength of printing inks 1 and 2 using the following formula:

$$\text{Dispersion Hardness } (DH) = \left[\frac{F_2}{F_1} - 1\right] \cdot 100$$

$F_1$ = color strength of printing ink 1
$F_2$ = color strength of printing ink 2

The results were compiled in the Table.

The color strength of the paste and printing inks 1 and 2 are stated in color equivalents. The color equivalents are based on the color of pigment I after three milling passages on the roller mill (color equivalent = 100).

TABLE

| | Test Results | | | |
| | Color Strength | | | |
| Pigment | Paste | Printing Ink 1 | Printing Ink 2 | DH |
|---|---|---|---|---|
| I | 158 | 118 | 100 (comparison) | 18 |
| 1 | 149 | 97 | 85 | 14 |
| 2 | 178 | 110 | 95 | 15 |
| 3 | 124 | 107 | 106 | 1 |
| 4 | 135 | 113 | 104 | 8 |
| 5 | 129 | 91 | 85 | 7 |
| 6 | 109 | 83 | 81 | 4 |
| 7 | 123 | 106 | 106 | 0 |
| 8 | 176 | 159 | 157 | 2 |
| 9 | 139 | 106 | 86 | 23 |
| 10 | 122 | 97 | 86 | 12 |
| 11 | 134 | 95 | 83 | 15 |
| 12 | 119 | 97 | 91 | 7 |
| 13 | 174 | 112 | 98 | 5 |
| 14 | 122 | 97 | 94 | 4 |
| 15 | 153 | 121 | 109 | 11 |

TABLE-continued

| | Test Results | | | |
| | Color Strength | | | |
| Pigment | Paste | Printing Ink 1 | Printing Ink 2 | DH |
|---|---|---|---|---|
| 16 | 184 | 135 | 106 | 6 |
| 17 | 133 | 97 | 92 | 5 |
| 18 | 1120 | 500 | 385 | 18 |
| 19 | 890 | 400 | 300 | 08 |

EXAMPLE 18

To an amount of 522.5 grams of an aqueous alkaline solution (pH = 12.6) containing 50 grams of alkali blue (produced by phenylation of parafuchsin with aniline, sulfonization with sulfuric acid and discharging into water) 50 grams of a 2 percent sodium hydroxide solution was added which contained 8.3 grams of dodecylbenzenesulfonic acid. While vigorously stirring, a solution of 7.5 grams of N,N-dimethyloctadecylamine in 730 grams of 2 percent hydrochloric acid was slowly added to the mixture which was at a temperature of 60° C. The suspension was agitated at 60° C. and was then adjusted to a pH of 0.8 using 10 percent hydrochloric acid. Subsequently the mixture was heated to 95° C. and maintained at 95° C. for 5 minutes. By adding cold water, the temperature was adjusted to 60° C., the pigment removed by filtration, washed and dried at 50° C. A high color strength pigment was obtained which was easily dispersible in offset printing ink varnishes.

EXAMPLE 19

To a solution (467 grams) of 50 gram alkali blue (prepared by phenylation of parafuchsin with aniline and subsequent sulfonization) were added 50 grams of 2 percent sodium hydroxide solution which contained 3.5 grams of dodecylbenzenesulfonic acid. The solution at a temperature of 60° C. was then slowly added to a solution of 3.24 grams of N,N-domethyloctadecylamine in 800 grams of 1.5 percent hydrochloric acid which had been heated to 60° C. Subsequently the suspension was adjusted to a pH of 0.85, heated to boiling and kept at the boiling temperature for 10 minutes. By adding cold water the mixture was adjusted to 60° C., the pigment was removed by filtration, washed and dried (55° C.). A pigment was obtained with high color strength and excellent crystal hardness.

EXAMPLE 20

The procedure was analogous to that put forth in Example 19 but N,N-dimethyloctadecylamine was replaced by an equal amount of coconut fatty amine (95 percent primary and 5 percent seconday and tertiary amines).

This procedure also resulted in an alkali blue pigment of high color strength and good crystal hardness.

EXAMPLE 21

The employed procedure was that described in Example 19 but instead of N,N-dimethyloctadecylamine, the identical quantity of a mixture of N-coconut fatty alkyl 1,3-propylenediamine and bis-N-coconut fatty alkyl-1,3-propylenediamine (1:1) was used. The result was a high color strength pigment, the properties of which largely corresponded with those obtained according to Example 19.

EXAMPLE 22

4,116 grams of a 24.3 percent presscake of alkali blue (=1,000 grams of alkali blue dry) which were obtained by precipitating an alkaline solution of alkali blue with mineral acid, filtration and washing were mixed with 9 kilograms of water and the suspension was dispersed with a disperser at 5,000 rpm for a period of 15 minutes. A solution of 46 grams of N,N-dimethyloctadecylamine in 240 grams of water and 10 grams of concentrated hydrochloric acid were slowly added to the suspension and the suspension was subsequently homogenized in the disperser for 15 minutes. At this point, 50 grams of dodecylbenzene sulfonic acid in the form of a 10 percent aqueous solution were added to the suspension which was homogenized at approximately 6,000 rpm for 15 minutes. The pigment was removed by filtration, washed and dried (50° C.). Yield: 1,070 grams of alkali pigment with very high color strength and easily dispersible in offset printing ink varnishes.

EXAMPLE 23

The procedure was analogous to that put forth in Example 22 but the suspension was in each case homogenized by three passages through a colloid mill instead of being agitated in the disperser.

An alkali blue pigment was obtained, the properties of which essentially corresponded with the pigment obtained according to Example 22.

EXAMPLE 24

The procedure was that put forth in Example 20 but hydrochloric acid was replaced by acetic acid for dissolving the amine. In this case, the pigment could be isolated directly by drying the suspension.

This method resulted in an alkali blue pigment with very high color strength and excellent crystal hardness.

I claim:

1. Process for the preparation of easily dispersible high color strength powdered alkali blue pigments by precipitating the pigment from an aqueous alkaline solution with acids wherein the pigment is either precipitated in the presence of
   (1) primary, secondary or tertiary aliphatic amines carrying at least one $C_1$-$C_{20}$ alkyl and $C_8$-$C_{20}$ alkoxy-$C_2$-$C_4$ alkyl
   (2) N-$C_8$-$C_{20}$alkyl amino-$C_2$-$C_8$-alkanic acids
   (3) diaryl or triaryl amines
   (4) acid or neutral esters of phosphoric acid based on fatty alcohol, fatty alcohol alkoxylates, polypropylene glycol, polyethylene glycol or block copolymers based on propylene oxide and ethylene oxide
   (5) half ester of sulfuric acid based on $C_{10}$-$C_{20}$ fatty alcohol, fatty alcohol ethylene oxide adducts or $C_5$-$C_{20}$ alkyphenol ethylene oxide adducts
   (6) $C_8$-$C°$alkane or alkene sulfonic acids $C_6$-$C_{20}$ alkylbenzene sulfonic acids, $C_1$-$C_{20}$ alkylnaphthalene sulfonic acids or di-$C_6$-$C_{20}$ alkyl sulfimides
   (7) ethylene oxide adducts based on $C_1$-$C_{20}$ alkyl phenols, $C_8$-$C_{20}$ alkanols or $C_{10}$-$C_{20}$ alkyamines wherein the adducts contain at least five ethylene oxide radicals
   (8) propylene glycols, or of block copolymers based on alkane diols or alkane polyols with 2 to 8 carbon atoms with propylene oxide and ethylene oxide or mixtures of these substances at temperatures of 50° to 100° C. or the pigment alone is precipitated at 50° C. to 100° C. and wherein at least one of the substances listed under (1) to (8) is added to the warm pigment suspension while mixing with a pH value in the suspension amounting to 0.8 to 5 at the end of the precipitation and/or to the isolation.

2. The process of claim 1 wherein the precipitation is carried out in the presence of
   (1.1) $C_{10}$- to $C_{20}$- alkyl amine or of 3-($C_8$- to $C_{20}$-alkoxy)propylamine with the N-atoms of the amines possibly being substituted by $C_1$- to $C_4$-alkyl or substituted single or two-fold,
   (2.1) N-$C_{10}$- to $C_{20}$-alkyl amino buteric acid, alkanic acid,
   (4.1)
   (a) neutral esters of phosphoric acids based on $C_3$- to $C_{18}$- alkanol as a mixture with nonionic ethylene oxide adducts of group (7),
   (b) neutral esters of acid phosphoric acid based on ethylene oxide or of propylene oxideethylene oxide adducts of $C_{10}$- to $C_{20}$-alkanols,
   (5.1) sulfuric acid half esters of ethylene oxide adducts of $C_{10}$- to $C_{20}$- alkyl phenols with the adducts containing 2 to 6 EO per mole on the average,
   (6.1) $C_8$- to $C_{20}$-alkyl benzene sulfonic acid,
   (7.1) ethylene oxide adducts to $C_6$- to $C_{20}$-alkanols with 5 to 55 moles of EO per mole of phenol and/or alkanol or mixtures thereof or wherein the warm pigment suspension is mixed with at least one of the substances referred to under (1.1), (2.1), (4.1), (5.1), (6.1) or (7.1) while being thoroughly mixed.

3. The process of claim 1 wherein the precipitation is carried out in the presence of
   (1.2) $C_{14}$- to $C_{20}$- alkyl amines or 3-($C_{10}$- to $C_{20}$-alkoxy)-propyl amines, where the N-atoms are possibly substituted single fold or two-fold by $C_1$- to $C_4$-alkyl,
   (2.2) $\beta$(N-$C_{10}$- to $C_{20}$-alkyl amino)buteric acids,
   (4.2)
   (a) neutral esters of phosphoric acids based on $C_3$- to $C_{18}$-alkanols mixed with ethylene oxide adducts of $C_6$- to $C_{20}$-alkyl phenols or $C_8$- to $C_{20}$-alkanols with 5 to 55 moles of EO per mole of phenol/alkanol,
   (b) neutral esters of phosphoric acid based on ethylene oxide or propylene oxide-ethylene oxide adducts to $C_{10}$- to $C_{20}$-alkanols,
   (5.2) half esters of sulfuric acid of ethylene oxide adducts of $C_{10}$- to $C_{20}$-alkanols or $C_6$- to $C_{20}$-alkyl phenols wherein the adducts contain an average of 2 to 6 EO per mole of alkanol/phenol,
   (6.2) $C_8$- to $C_{20}$-alkyl benzene sulfonic acids,
   (7.2) ethylene oxide adducts of $C_6$- to $C_{20}$-alkyl phenols or $C_8$- to $C_{20}$-alkanols wherein the adducts contain 5 to 55 moles of EO per mole of phenol/alkanol,
   (9) mixtures of the esters of phosphoric acids referred to under (4.2)(b) with $C_{10}$- to $C_{20}$- alkyl amines or 3-$C_8$- to $C_{20}$-alkoxy)propylamines wherein the amino group may possibly be substituted on a single or two-fold basis by $C_1$- to $C_4$-alkyl, or
   (10) mixtures of the alkylbenzene sulfonic acids referred under (6.2) with $C_{10}$- to $C_{20}$-alkyl amines or 3-($C_8$- to $C_{20}$-alkoxy)propyl amines wherein the amino group may possibly be substituted on a single or two-fold basis by $C_1$- to $C_4$-alkyl.

4. The process of claim 1 wherein the aqueous suspension of the precipitated alkali blue pigment is mixed with a solution or suspension of (1.2) $C_{14}$- to $C_{20}$-alkyl amines or 3-($C_{10}$- to $C_{20}$-alkoxy)-propyl amines with a possible single or two-fold substitution of the N-atoms for $C_1$- to $C_4$-alkyl, (2.2) $\beta$(N-$C_{10}$- to $C_{20}$- alkylamino)buteric acids, (4.2)
- (a) neutral esters of phosphoric acid based on $C_3$- to $C_{18}$-alkanols mixed with ethylene oxide adducts of $C_6$- to $C_{20}$-alkylphenols or $C_8$- to $C_{20}$-alkanols with 5 to 55 moles of EO per mole of phenol/alkanol
- (b) acid esters of phosphoric acid based on ethylene oxide or propylene oxide-ethylene oxide adducts of $C_{10}$- to $C_{20}$-alkanols, (5.2) half esters of sulfuric acid of ethylene oxide adducts of $C_{10}$- to $C_{20}$-or $C_6$- to $C_{20}$-alkyl phenols with the adducts containing an average of 2 to 6 EO per mole of alkanol/phenol, (6.2) $C_8$- to $C_{20}$-alkyl benzene sulfonic acids, (7.2) ethylene oxide adducts of $C_6$- to $C_{20}$-alkyl phenols or $C_8$- to $C_{20}$-alkanols with the adducts containing 5 to 55 moles of EO per mole of phenol/alkanol (9) mixtures of the phosphoric acid esters referred to under (4.2)(b) with $C_{10}$- to $C_{20}$-alkyl amines or 3-($C_8$- to $C_{20}$alkoxy)-propyl amine with the amino group possibly being substituted single or two-fold by $C_1$- to $C_4$-alkyl, or

(10) mixtures of the alkyl benzene sulfonic acid referred to under (6.2) with $C_{10}$- to $C_{20}$-alkyl amines or 3- ($C_8$- to $C_{20}$-alkoxy)propyl amines with the amino group possibly being substituted on a single or two-fold basis by $C_1$- to $C_4$ alkyl and wherein the pigment is isolated after mixing.

5. The process of claim 1 wherein 2 to 20 percent by weight relative to alkali blue of the substances referred to under (1) through (8) or mixtures thereof are used.

6. The process of claim 5 wherein the precipitation is carried out in the presence of (1.1) $C_{10}$- to $C_{20}$alkyl amine or of 3- $C_8$- to $C_{20}$-alkoxy)-propylamine with the N-atoms of the amines possibly being substituted by $C_1$- to $C_4$-alkyl or substituted single or two-fold, (2.1) N-$C_{10}$- to $C_{20}$- alkyl amino buteric acid, alkanic acid, (4.1)
- (a) neutral esters of phosphoric acids based on $C_3$- to $C_{18}$-alkanol as a mixture with nonionic ethylene oxide adducts of group (7),
- (b) neutral esters of acid phosphoric acid based on ethylene oxide or of propylene oxide-ethylene oxide adducts of $C_{10}$- to $C_{20}$-alkanols.

(5.1) sulfuric acid half esters of ethylene oxide adducts of $C_{10}$- to $C_{20}$-alkyl phenols with the adducts containing 2 to 6 EO per mole on the average, (6.1) $C_8$- to $C_{20}$-alkyl benzene sulfonic acid, (7.1) ethylene oxide adducts to $C_6$- to $C_{20}$-alkanols with 5 to 55 moles of EO per mole of phenol and/or alkanol or mixtures thereof or wherein the warm pigment suspension is mixed with at least one of the substances referred to under (1.1), (2.1), (4.1), (5.1), 6.1) or (7.1) while being thoroughly mixed.

7. The process of claim 5 wherein the precipitation is carried out in the presence of (1.2) $C_{14}$- to $C_{20}$-alkyl amines or 3-($C_{10}$- to $C_{20}$-alkoxy)-propyl amines, where the N-atoms are possibly substituted single fold or two-fold by $C_1$- to $C_4$-alkyl, (2.2) $\beta$(N- $C_{10}$- to $C_{20}$- alkyl amino)buteric acids, (4.2)
- (a) neutral esters of phosphoric acids based on $C_3$- to $C_{18}$-alkanols mixed with ethylene oxide adducts of $C_6$- to $C_{20}$-alkyl phenols or $C_8$- to $C_{20}$-alkanols with 5 to 55 moles of EO per mole of EO per mole of phenol/alkanol,
- (b) neutral esters of phosphoric acid based on ethylene oxide or propylene oxide-ethylene oxide adducts of $C_{10}$- to $C_{20}$-alkanols, (5.2) half esters of sulfuric acid of ethylene oxide adducts of $C_{10}$- to $C_{20}$- alkanols or $C_6$- to $C_{20}$-alkyl phenols wherein the adducts contain an average of 2 to 6 EO per mole of alkanol/phenol, (6.2) $C_8$- to $C_{20}$-alkyl benzene sulfonic acids, (7.2) ethylene oxide adducts of $C_6$- to $C_{20}$-alkyl phenols or $C_8$- to $C_{20}$-alkanols wherein the adducts contain 5 to 55 moles of EO per mole of phenol/alkanol, (9) mixtures of the esters of phosphoric acids referred to under (4.2)(b) with $C_{10}$- to $C_{20}$-alkyl amines or 3-$C_8$- to $C_{20}$- alkoxy)propylamines wherein the amino group may possibly be substituted on a single or two-fold basis by $C_1$- to $C_4$-alkyl, or

(10) mixtures of the alkylbenzene sulfonic acids referred to under (6.2) with $C_{10}$- to $C_{20}$-alkyl amines or 3-($C_8$- to $C_{20}$-alkoxy)propyl amines wherein the amino group may possibly be substituted on a single or two-fold basis by $C_1$- to $C_4$-alkyl.

8. The process of claim 5 wherein the aqueous suspension of the precipitated alkali blue pigment is mixed with a solution or suspension of (1.2) $C_{14}$- to $C_{20}$-alkyl amines or 3-($C_{10}$- to $C_{20}$-alkyoxy)propyl amines with a possible single or two-fold substitution of the N-atoms for $C_1$- to $C_4$-alkyl, (2.2) $\beta$(N-$C_{10}$- to $C_{20}$-alkylamino)buteric acids, (4.2)
- (a) neutral esters of phosphoric acid based on $C_3$- to $C_{18}$-alkanols mixed with ethylene oxide adducts of $C_6$- to $C_{20}$-alkyl-phenols or $C_8$- to $C_{20}$-alkanols with 5 to 55 moles of EO per mole of phenol/alkanol
- (b) acid esters of phosphoric acid based on ethylene oxide or propylene oxide-ethylene oxide adducts of $C_{10}$- to $C_{20}$-alkanols, (5.2) half esters of sulfuric acid of ethylene oxide adducts of $C_{10}$- to $C_{20}$- or $C_6$- to $C_{20}$-alkyl phenols with the adducts containing an average of 2 to 6 EO per mole of alkanol/phenol, (6.2 ) $C_8$- to $C_{20}$-alkyl benzene sulfonic acids, (7.2) ethylene oxide adducts of $C_6$- to $C_{20}$-alkyl phenols or $C_8$- to $C_2$.-alkanols with the adducts containing 5 to 55 moles of EO per mole of phenol/alkanol (9) mixtures of the phosphoric acid esters referred to under (4.2)(b) with $C_{10}$- to $C_{20}$-alkyl amines or 3-($C_8$- to $C_{20}$-alkoxy)-propyl amine with the amino group possibly being substituted single or two-fold by $C_1$- to $C_4$-alkyl, or

(10) mixtures of the alkyl benzene sulfonic acid referred to under (6.2) with $C_{10}$- to $C_{20}$-alkyl amines with the amino group possibly being substituted on a single or two-fold basis by $C_1$- to $C_4$-alkyl and wherein the pigment is isolated after mixing.

9. The process of claim 1 wherein 3 to 16 percent by weight relative to alkali blue of the substances referred to under (1) through (8) thereof are used.

10. The process of claim 9 wherein the precipitation is carried out in the presence of (1.1) $C_{10}$- to $C_{20}$-alkyl amine or of 3-($C_8$- to $C_{20}$-alkoxy)-propylamine with the N-atoms of the amines possibly being substituted by $C_1$- to $C_4$-alkyl or substituted single or two-fold, (2.1) N-$C_{10}$- to $C_{20}$-alkyl amino buteric acid, alkanic acid,
(4.1)
  (a) neutral esters of phosphoric acids based on $C_3$- to $C_{18}$-alkanol as a mixture with nonionic ethylene oxide adducts of group (7),
  (b) neutral esters of acid phosphoric acid based on ethylene oxide or of propylene oxide-ethylene oxide adducts of $C_{10}$- to $C_{2-}$-alkanols,
(5.1) sulfuric acid half esters of ethylene oxide adducts of $C_{10}$- to $C_{20}$-alkyl phenols with the adducts containing 2 to 6 EO per mole on the average,
(6.1) $C_8$- to $C_{20}$-alkyl benzene sulfonic acid,
(7.1) ethylene oxide adducts of $C_6$- to $C_{20}$-alkanols with 5 to 55 moles of EO per mole of phenol and/or alkanol or mixtures thereof or wherein the warm pigment suspension is mixed with at least one of the substances referred to under (1.1), (2.1), (4.1), (5.1), (6.1) or (7.1) while being thoroughly mixed.

11. The process of claim 9 wherein the precipitation is carried out in the presence of
(1.2) $C_{14}$- to $C_{20}$-alkyl amines or 3-($C_{10}$- to $C_{20}$-alkoxy)-propyl amines, where the N-atoms are possibly substituted single fold or two-fold by $C_1$- to $C_4$-alkyl,
(2.2) $\beta$(N- $C_{10}$- to $C_{20}$-alkyl amino)buteric acids,
(4.2)
  (a) neutral esters of phosphoric acids based on $C_3$- to $C_{18}$-alkanols mixed with ethylene oxide adducts of $C_6$- to $C_{20}$-alkyl phenols or $C_8$- to $C_{20}$-alkanols with 5 to 55 moles of EO per mole of phenol/alkanol,
  (b) neutral esters of phosphoric acid based on ethylene oxide or propylene oxide-ethylene oxide adducts of $C_{10}$- to $C_{20}$-alkanols,
(5.2) half esters of sulfuric acid of ethylene oxide adducts of $C_{10}$- to $C_{20}$-alkanols or $C_6$- to $C_{20}$-alkyl phenols wherein the adducts contain an average of 2 to 6 EO per mole of alkanol/phenol,
(6.2) $C_8$- to $C_{20}$-alkyl benzene sulfonic acids,
(7.2) ethylene oxide adducts of $C_6$- to $C_{20}$-alkyl phenols or $C_8$- to $C_{20}$-alkanols wherein the adducts contain 5 to 55 moles of EO per mole of phenol/alkanol,
  (9) mixtures of the esters of phosphoric acids referred to under (4.2)(b) with $C_{10}$- to $C_{20}$-alkyl amines or 3-$C_8$- to $C_{20}$-alkoxy)propylamines wherein the amino group may possibly be substituted on a single or two-fold basis by $C_1$- to $C_4$-alkyl, or
  (10) mixtures of the alkyl benzene sulfonic acids referred to under (6.2) with $C_{10}$- to $C_{20}$-alkyl amines or 3-($C_8$- to $C_{20}$-alkoxy)propyl amines wherein the amino group may possibly be substituted on a single or two-fold basis by $C_1$- to $C_4$-alkyl.

12. The process of claim 9 wherein the aqueous suspension of the precipitated alkali blue pigment is mixed with a solution or suspension of
(1.2) $C_{14}$- to $C_{20}$-alkyl amines or 3-($C_{10}$- to $C_{20}$-alkoxy)-propyl amines with a possible single or two-fold substitution of the N-atoms for $C_1$- to $C_4$-alkyl,
(2.2) $\beta$(N-$C_{10}$- to $C_{20}$-alkylamino)buteric acids,
(4.2)
  (a) neutral esters of phosphoric acid based on $C_3$- to $C_{18}$-alkanols mixed with ethylene oxide adducts of $C_6$- to $C_{20}$-alkyl-phenols or $C_8$- to $C_{20}$-alkanols with 5 to 55 moles of EO per mole of phenol/alkanol,
  (b) acid esters of phosphoric acid based on ethylene oxide or propylene oxide-ethylene oxide adducts of $C_{10}$- to $C_{20}$-alkanols,
(5.2) half esters of sulfuric acid of ethylene oxide adducts of $C_{10}$- to $C_{20}$- or $C_6$- to $C_{20}$-alkyl phenols with the adducts containing an average of 2 to 6 EO per mole or alkanol/phenol,
(6.2) $C_8$- to $C_{20}$-alkyl benzene sulfonic acids,
(7.2) ethylene oxide adducts of $C_6$- to $C_{20}$-alkyl phenols or $C_8$- to $C_{20}$-alkanols with the adducts containing 5 to 55 moles of EO per mole of phenol/alkanol
  (9) mixtures of the phosphoric acid esters referred to under (4.2)(b) with $C_{10}$- to $C_{20}$-alkyl amines or 3-($C_8$- to $C_{20}$-alkoxy)-propyl amine with the amino group possibly being substituted single or two-fold by $C_1$- to $C_4$-alkyl, or
  (10) mixtures of the alkyl benzene sulfonic acid referred to under (6.2) with $C_{10}$- to $C_{20}$- alkyl amines or 3- $C_8$- to $C_{20}$-alkoxy)propyl amines with the amino group possibly being substituted on a single or two-fold basis by $C_1$- to $C_4$-alkyl and wherein the pigment is isolated after mixing.

13. Alkali blue pigment obtained according to the method of claim 1.
14. Alkali blue pigment obtained according to the method of claim 2.
15. Alkali blue pigment obtained according to the method of claim 3.
16. Alkali blue pigment obtained according to the method of claim 4.
17. Alkali blue pigment obtained according to the method of claim 5.
18. Alkali blue pigment obtained according to the method of claim 6.
19. Alkali blue pigment obtained according to the method of claim 7.
20. Alkali blue pigment obtained according to the method of claim 8.
21. Alkali blue pigment obtained according to the method of claim 9.
22. Alkali blue pigment obtained according to the method of claim 10.
23. Alkali blue pigment obtained according to the method of claim 11.
24. Alkali blue pigment obtained according to the method of claim 12.
25. Printing inks containing the alkali blue pigment of claim 13.
26. Printing inks containing the alkali blue pigment of claim 14.
27. Printing inks containing the alkali blue pigment of claim 15.
28. Printing inks containing the alkali blue pigment of claim 16.
29. Printing inks containing the alkali blue pigment of claim 17.
30. Printing inks containing the alkali blue pigment of claim 18.
31. Printing inks containing the alkali blue pigment of claim 19.
32. Printing inks containing the alkali blue pigment of claim 20.
33. Printing inks containing the alkali blue pigment of claim 21.
34. Printing inks containing the alkali blue pigment of claim 22.
35. Printing inks containing the alkali blue pigment of claim 23.
36. Printing inks containing the alkali blue pigment of claim 24.
37. Printing inks containing the alkali blue pigment of claim 25.

* * * * *

UNITED STATES PATENT AND TRADEMARK OFFICE
CERTIFICATE OF CORRECTION

PATENT NO. : 4,456,485
DATED : June 26, 1984
INVENTOR(S) : Doreswamy R. Iyengar and Joachim Jesse It is certified that error appears in the above-identified patent and that said Letters Patent is hereby corrected as shown below:

Claim 1, line 57, should read (6) $C_8$-$C_{20}$ alkane

Signed and Sealed this

Second Day of April 1985

[SEAL]

Attest:

DONALD J. QUIGG

Attesting Officer     Acting Commissioner of Patents and Trademarks